United States Patent
Park et al.

(10) Patent No.: US 11,865,970 B2
(45) Date of Patent: Jan. 9, 2024

(54) VARIABLE-FOCUS LIGHTING DEVICE AND VARIABLE-FOCUS LIGHTING SYSTEM

(71) Applicants: HYUNDAI MOTOR COMPANY, Seoul (KR); KIA CORPORATION, Seoul (KR)

(72) Inventors: Sung Ho Park, Seoul (KR); Jung Wook Lim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/828,877

(22) Filed: May 31, 2022

(65) Prior Publication Data

US 2022/0396203 A1    Dec. 15, 2022

(30) Foreign Application Priority Data

Jun. 15, 2021   (KR) .................. 10-2021-0077450

(51) Int. Cl.
| | |
|---|---|
| *B60Q 3/60* | (2017.01) |
| *F21V 14/06* | (2006.01) |
| *H05B 47/115* | (2020.01) |
| *G02B 3/14* | (2006.01) |
| *F21Y 115/10* | (2016.01) |

(52) U.S. Cl.
CPC .............. *B60Q 3/60* (2017.02); *F21V 14/06* (2013.01); *G02B 3/14* (2013.01); *H05B 47/115* (2020.01); *F21Y 2115/10* (2016.08)

(58) Field of Classification Search
CPC ... B60Q 3/60; B60Q 3/80; B60Q 3/76; H05B 47/115; F21V 14/06; F21V 14/065; F21V 5/04; F21V 9/35; F21V 5/045; F21V 5/048; G02B 3/14; G02B 7/04; F21Y 2115/10; F21S 41/635; F21W 2106/00
See application file for complete search history.

(56) References Cited

U.S. PATENT DOCUMENTS

| | | | | |
|---|---|---|---|---|
| 4,345,303 A | * | 8/1982 | Gerard ..................... | B60Q 1/06 362/279 |
| 2012/0287621 A1 | * | 11/2012 | Lee .......................... | F21V 5/04 362/231 |
| 2013/0063953 A1 | * | 3/2013 | Lee .......................... | F21V 5/04 362/311.02 |
| 2014/0233244 A1 | * | 8/2014 | Jurik ....................... | F21V 14/06 362/319 |
| 2016/0377265 A1 | * | 12/2016 | Hansen .................... | F21V 9/40 362/268 |
| 2019/0104239 A1 | * | 4/2019 | Aschwanden ..... | H04N 23/6811 |

FOREIGN PATENT DOCUMENTS

KR            102202016 B1        1/2021

* cited by examiner

*Primary Examiner* — Bao Q Truong
(74) *Attorney, Agent, or Firm* — LEMPIA SUMMERFIELD KATZ LLC

(57) ABSTRACT

A variable-focus lighting device and a variable-focus lighting system have one light source and are used to adjust the position and focus of light that is emitted, among various positions in an interior space. An installation space on an interior roof is reduced and manufacturing costs are reduced.

14 Claims, 8 Drawing Sheets

VARIABLE-FOCUS LIGHTING DEVICE AND VARIABLE-FOCUS LIGHTING SYSTEM

CROSS REFERENCE TO RELATED APPLICATION

The present application claims priority to Korean Patent Application No. 10-2021-0077450 filed on Jun. 15, 2021, the entire contents of which are incorporated herein for all purposes by this reference.

BACKGROUND

1. Field of the Disclosure

The present disclosure relates to a variable-focus lighting device and a variable-focus lighting system, wherein in connection with an indoor lighting lamp, light can be emitted to various positions in the indoor space using a single light source.

2. Description of the Prior Art

In general, vehicles are expected to provide, beyond conventional functions as means of transportation, various means for convenience such that users can get aboard more stably and comfortably.

Vehicle indoor lighting, which is one of such devices for convenience, is evolving. Instead of simply lighting the vehicle interior, the driver and other occupants are provided with a comfortable and relaxing atmosphere.

In particular, interior lighting is installed to be concealed at the center of the vehicle roof or between the driver seat and the front passenger seat so as to light the vehicle interior.

Once interior lighting is installed in the initial position, light is emitted to a designated position in a fixed direction. In other words, interior lighting includes a light source concealed in the roof and a lens that covers the light source. When the interior lighting operates (e.g., is turned on), light from the light source passes through the lens and is projected into the interior space.

As a result, according to the prior art, a lighting module including a light source and a lens needs to be installed in each desired light-emitting position such that light is emitted to various interior positions. This has a problem in that the cost for configuring lighting modules increases, space for installing each respective lighting module needs to be secured, and the interior roof design is degraded.

The above description regarding background technologies has been made only to help understand the background of the present disclosure. The above description is not to be deemed by those of ordinary skill in the art to correspond to already-known prior art.

SUMMARY

The present disclosure has been proposed to solve the above-mentioned problems. It is an aspect of the present disclosure to provide a variable-focus lighting device and a variable-focus lighting system, wherein a single light source is used to emit light to various positions in an interior space. Thus, the installation space on the roof is reduced and manufacturing costs are decreased.

In accordance with an aspect of the present disclosure, a variable-focus lighting device includes: a light source configured to emit light; a variable-focus lens on which light from the light source is incident and which is configured to have a deformable shape such that a position and a type in which light is emitted are changed depending on a type of deformation; and a driver to which the variable-focus lens is connected. The driver is configured to deform the variable-focus lens such that a position and a type of light that is emitted satisfy a command signal when the command signal is input.

The variable-focus lens may include a lens part on which light from the light source is incident and which is configured to cause the incident light to exit with a focus. The variable-focus lens may also include a connection part extending from an edge of the lens part, connected to the driver, and configured to be moved by an operation of the driver to deform the lens part.

The lens part may be formed to convexly protrude in an opposite direction to the light source and may be configured to have a focus, which varies according to deformation of a shape thereof by movement of the connection part.

The lens part may be formed in a zigzag type or to be bent, so as to be unfolded or folded by an operation of the driver.

One portion of an edge of the variable-focus lens may be fixed through a fixing part. The driver may be connected to the variable-focus lens at an opposite side to the fixing part.

Multiple drivers may be disposed or used, and the respective drivers may be disposed to be symmetric to each other with reference to a center of the variable-focus lens.

The driver may include a one-side (e.g., a first side) driver and another-side (e.g., a second side) driver. The one-side driver and the other-side driver may be disposed to be symmetric to each other at both sides of the variable-focus lens.

In accordance with another aspect of the present disclosure, a variable-focus lighting system includes: a light source installed in an interior space so as to emit light in the interior space; a first variable-focus lens on which light from the light source is incident and which is configured to be flexibly deformed; a second variable-focus lens on which light having passed through the first lens is incident and which is configured to be flexibly deformed; a first driver connected to the first variable-focus lens so as to deform the first variable-focus lens in a lateral direction of the interior space when a command signal is input; a second driver connected to the second variable-focus lens so as to deform the second variable-focus lens in the forward/backward direction of the interior space when a command signal is input; and a controller. The controller is configured to transfer, based on input desired lighting, command signals to the first driver and the second driver to deform the first variable-focus lens and the second variable-focus lens so that a position and a type in which light is emitted satisfy the desired lighting.

The first driver may include a first X-axis driver and a second X-axis driver. The first X-axis driver and the second X-axis driver may be disposed to be symmetric to each other leftward and rightward from a center of the first variable-focus lens.

The controller may be configured to, when the desired lighting is input in a position spaced leftward from an installation position of the light source, transfer a command signal to the second X-axis driver such that the first variable-focus lens is deformed leftward. The controller may also be configured to, when the desired lighting is input in a position spaced rightward from the installation position of the light source, transfer a command signal to the first X-axis driver such that the first variable-focus lens is deformed rightward.

The controller may be configured to, when the desired lighting is input so as to be diffused in lateral, e.g., a leftward or rightward direction from the installation position of the light source, transfer command signals to the first X-axis driver and the second X-axis driver such that the first variable-focus lens is deformed into an initial shape or deformed to be unfolded in the leftward or rightward direction.

The second driver may include a first Y-axis driver and a second Y-axis driver. The first Y-axis driver and the second Y-axis driver may be disposed to be symmetric to each other in a forward/backward direction from a center of the second variable-focus lens.

The controller may be configured to, when the desired lighting is input in a position spaced forward from the installation position of the light source, transfer a command signal to the second Y-axis driver such that the second variable-focus lens is deformed forward. The controller may also be configured to, when the desired lighting is input in a position spaced backward from the installation position of the light source, transfer a command signal to the first Y-axis driver such that the second variable-focus lens is deformed backward.

The controller may be configured to, when the desired lighting is input to be diffused in the forward or backward direction from the installation position of the light source, transfer command signals to the first Y-axis driver and the second Y-axis driver such that the second variable-focus lens is deformed into the initial shape or deformed to be unfolded in the forward or backward direction.

The controller may be configured to perform control such that brightness of the light source varies when the input desired lighting is focused on a particular position or is diffused.

A variable-focus lighting device and a variable-focus lighting system having the above-mentioned structure are advantageous in that a single light source is used to emit light to various positions in an indoor space, thereby reducing the installation space on the indoor roof and decreasing the manufacturing costs.

DETAILED DESCRIPTION OF THE EMBODIMENTS

Hereinafter, a variable-focus lighting device and a variable-focus lighting system according to embodiments of the present disclosure are described with reference to the accompanying drawings.

Figure 1:
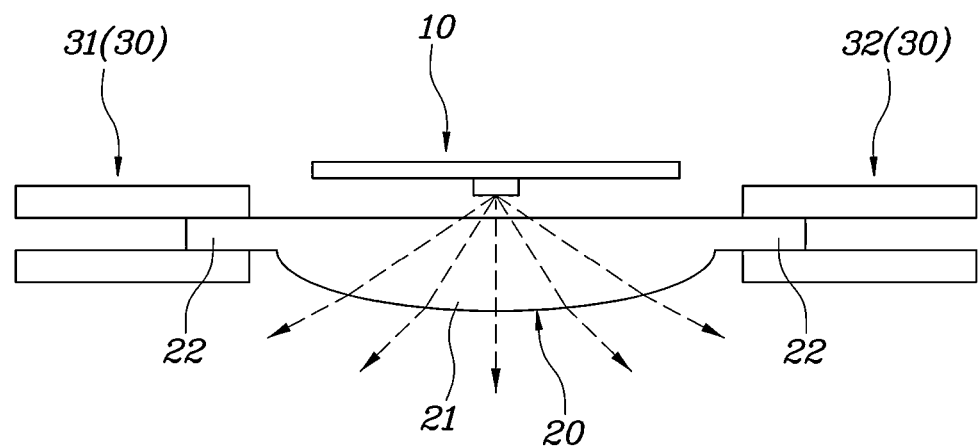
FIG. 1 illustrates a variable-focus lighting device according to the present disclosure.
Figure 2:
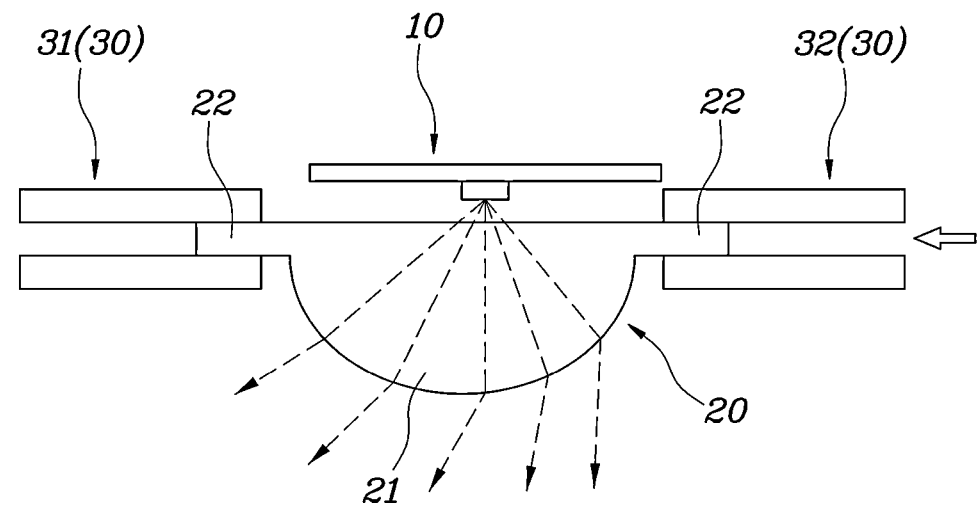
FIG. 2 illustrates an operation of the variable-focus lighting device illustrated in FIG. 1.
Figure 3:
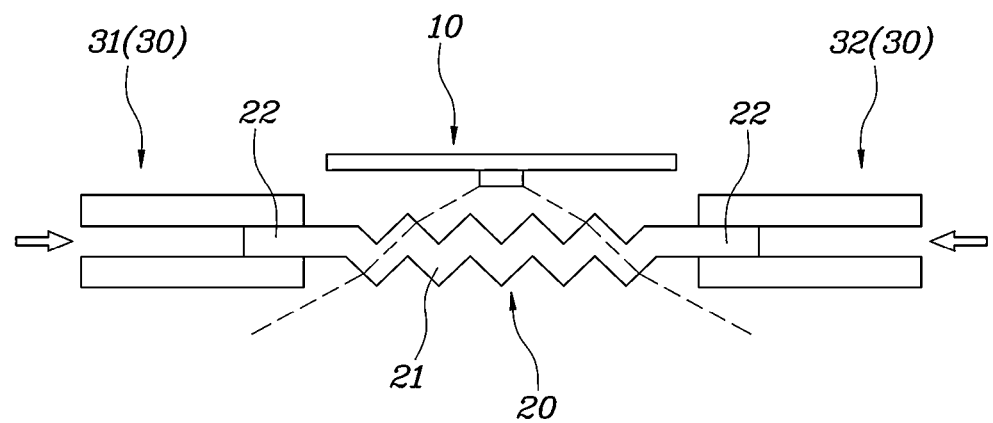
FIG. 3 illustrates a variable-focus lighting device according to another embodiment of the present disclosure.
Figure 4:
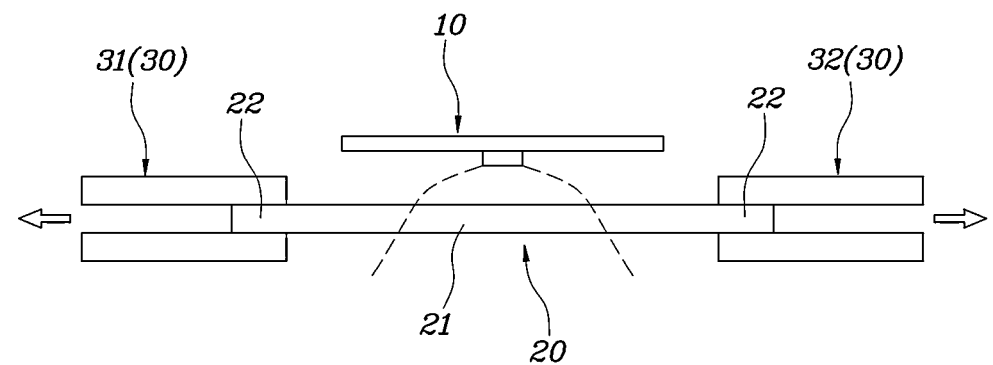
FIG. 4 illustrates an operation of the variable-focus lighting device illustrated in FIG. 3.
Figure 5:
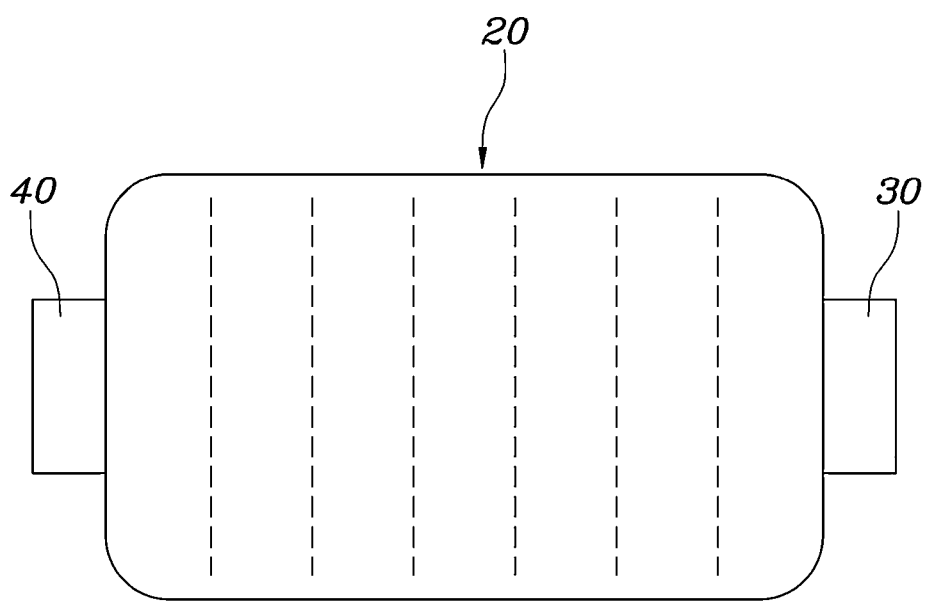
FIG. 5 illustrates an application of a fixing part in a variable-focus lighting device.

FIG. 1 illustrates a variable-focus lighting device according to the present disclosure. FIG. 2 illustrates an operation of the variable-focus lighting device illustrated in FIG. 1. FIG. 3 illustrates a variable-focus lighting device according to another embodiment of the present disclosure. FIG. 4 illustrates an operation of the variable-focus lighting device illustrated in FIG. 3. FIG. 5 illustrates an application of a fixing part in a variable-focus lighting device.

Figure 6:
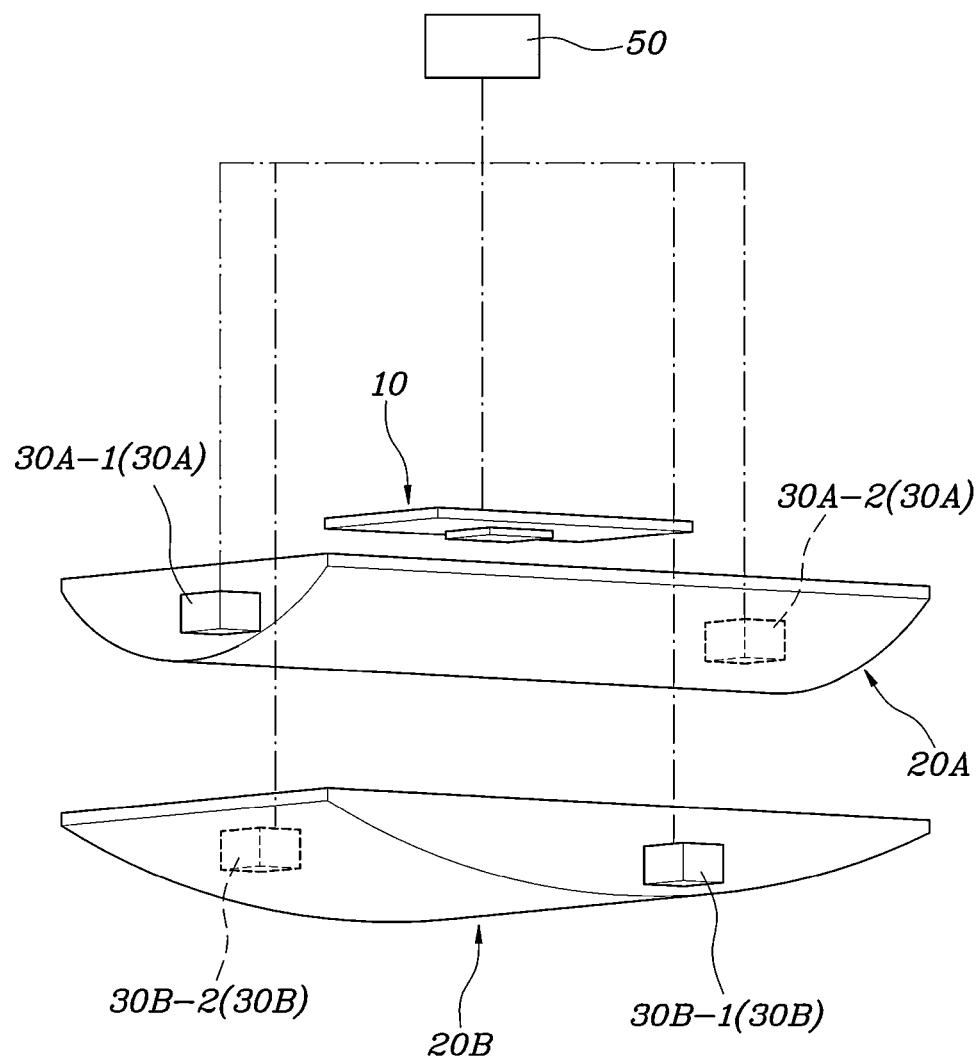
FIG. 6 illustrates a variable-focus lighting system according to another embodiment of the present disclosure.
Figure 7:
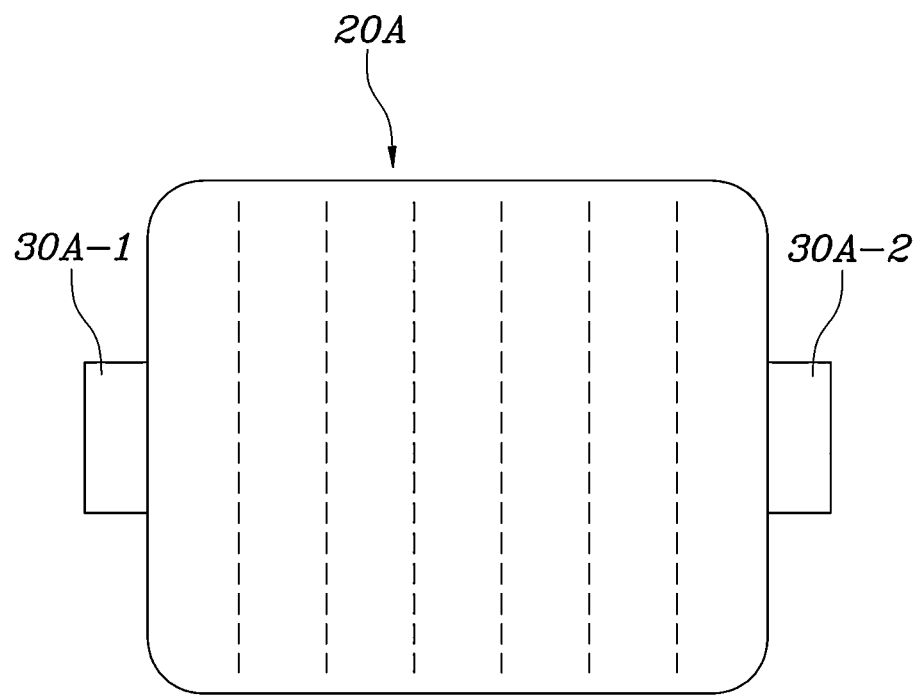
FIG. 7 illustrates a first variable-focus lens and a first driver of the variable-focus lighting system illustrated in FIG. 6.
Figure 8:
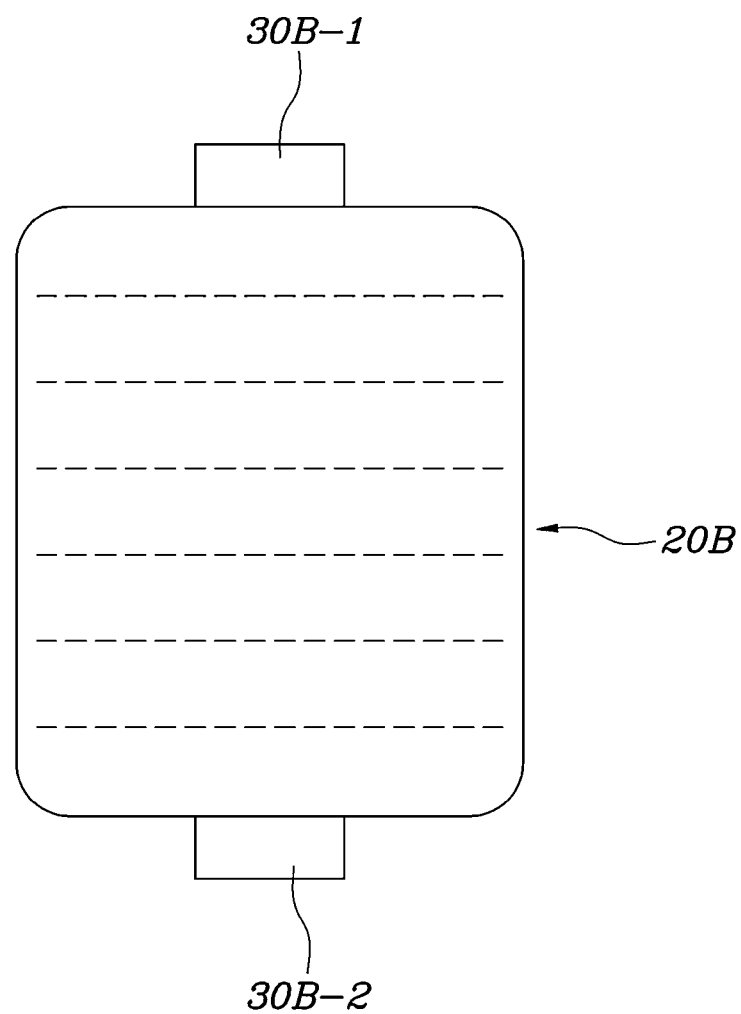
FIG. 8 illustrates a second variable-focus lens and a second driver of the variable-focus lighting system illustrated in FIG. 6.
Figure 9:
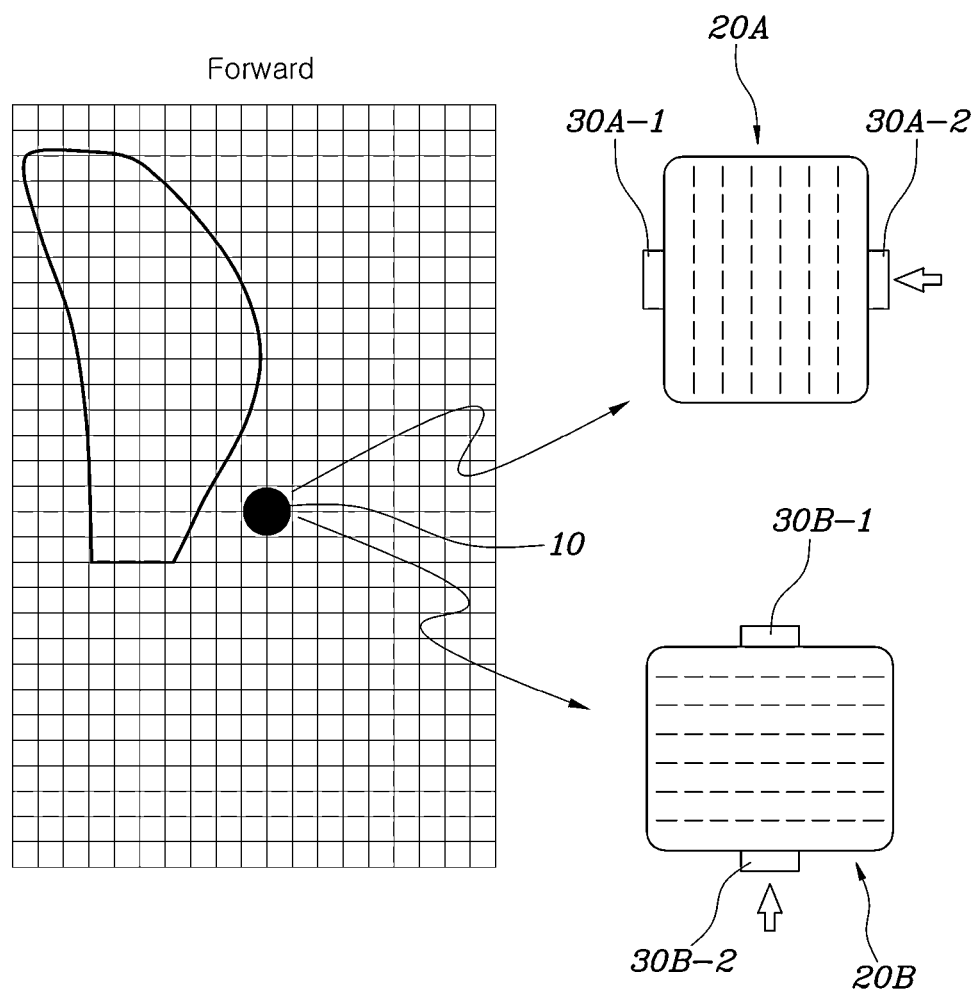
FIGS. 9 and 10 illustrate embodiments of a variable-focus lighting system.
Figure 10:
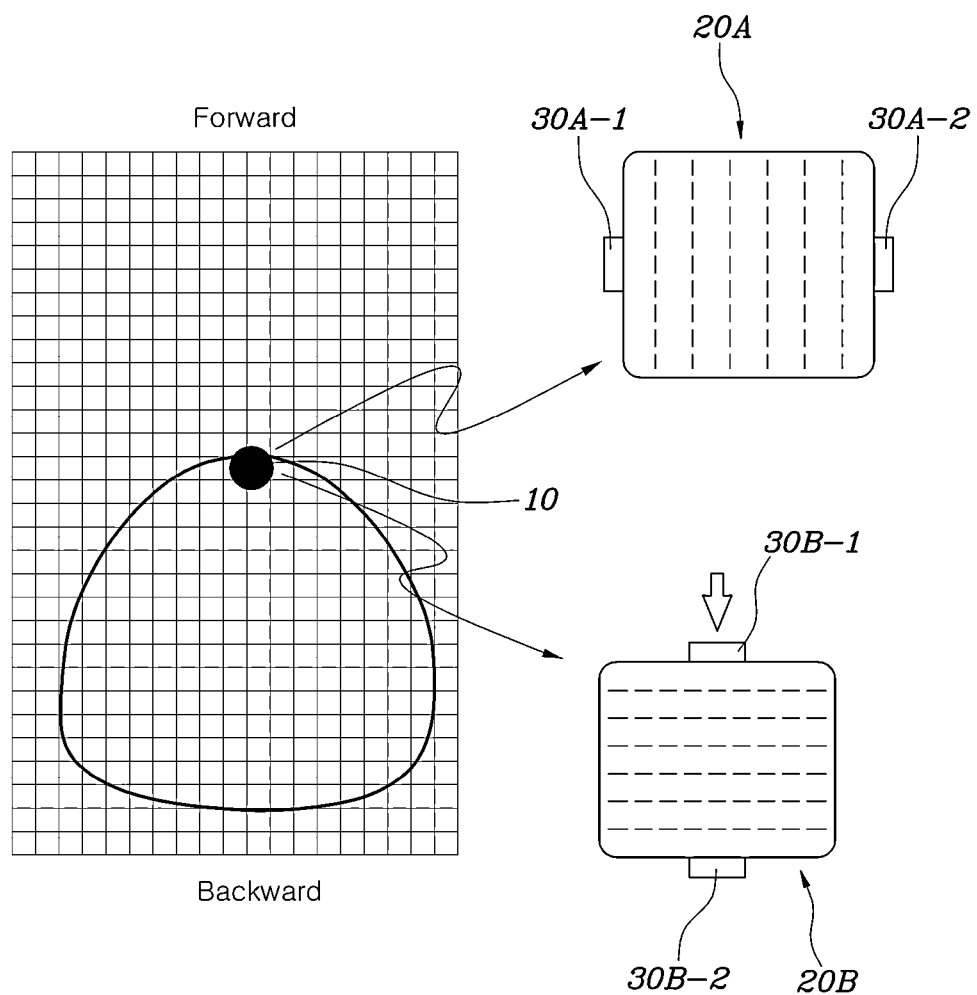

Further, FIG. 6 illustrates a variable-focus lighting system according to another embodiment of the present disclosure. FIG. 7 illustrates a first variable-focus lens and a first driver of the variable-focus lighting system illustrated in FIG. 6. FIG. 8 illustrates a second variable-focus lens and a second driver of the variable-focus lighting system illustrated in FIG. 6. FIGS. 9 and 10 illustrate embodiments of a variable-focus lighting system.

As illustrated in FIG. 1, a variable-focus lighting device according to the present disclosure includes a light source 10 configured to emit light and a variable-focus lens 20 on which light from the light source 10 is incident and which is configured to have a deformable shape such that a position and a type in which light is emitted are changed depending on the type of deformation. The variable-focus lighting device further includes a driver 30 to which the variable-focus lens 20 is connected and which is configured to deform the variable-focus lens 20 such that a position and a type in which light is emitted satisfy a command signal when the command signal is input.

The light source 10 may be formed as an LED and may be installed on an interior of the roof inside the vehicle.

The variable-focus lens 20 is installed such that light emitted from the light source 10 is incident thereon and causes light to exit with a focus. The variable-focus lens 20 is formed of a silicone material so as to be flexibly deformed and to allow light to pass therethrough. Light is refracted according to the type of deformation, and thus a position of the light and a deformation type of the lens in which light is emitted are changed.

The type of deformation of the variable-focus lens 20 is determined based on an operation of the driver 30. The driver 30 may be controlled by a controller 50. The controller 50 determines a position to which light is emitted, based on a user's manipulation of a switch or user position information. The controller 50 transfers, to the driver 30, a command signal according to the determined position where light is emitted. The driver 30 is operated by the command signal to deform the variable-focus lens 20.

Thus, the variable-focus lens 20 may be deformed in a direction in which the same is unfolded or folded by the driver 30 or may be deformed to tilt in the upward/downward direction.

As described above, in the present disclosure, the variable-focus lens 20 may be deformed by the driver 30. Thus, a position and a type of light emitted from the light source 10 are changed depending on the type of deformation of the variable-focus lens 20. Thus, one light source 10 can emit light to various positions in an interior space of the vehicle.

When the above-mentioned present disclosure is specifically described, the variable-focus lens 20 includes a lens part 21 on which light from the light source 10 is incident. The lens part 21 causes the incident light to exit with a focus. The variable-focus lens 20 also includes a connection part 22 extending from the edge of the lens part 21. The connection part 22 is connected to the driver 30 and configured to be moved by an operation of the driver 30 to deform the lens part 21.

As illustrated in FIG. 1, the variable-focus lens 20 includes the lens part 21 and the connection part 22. The lens part 21 may be formed such that incident light exits with a focus. The connection part 22 extends from the edge of the lens part 21, is connected to the driver 30, and is moved by an operation of the driver 30 to deform the lens part 21. Therefore, the variable-focus lens 20 may be installed such that the lens part 21 faces the light source 10. The connection part 22 extends from the lens part 21 and may be connected to the driver 30. Thus, light having passed through the lens part 21 may exit with a focus without interference from the driver 30.

The lens part 21 and the connection part 22, constituting the variable-focus lens 20, in one example are integrally formed of the same material. Further, when the connection part 22 deforms the shape of the lens part 21 by the driver 30, light passing through the lens part 21 is refracted. Thus, a position and a type of light that is emitted are changed.

The lens part 21 may have various shapes according to different embodiments of the present disclosure.

In an embodiment, as illustrated in FIG. 1, the lens part 21 may be formed to convexly protrude in the direction opposite to the light source 10. As the shape of the lens part 21 is deformed by the movement of the connection part 22, the focus of the lens part 21 may vary.

The lens part 21 convexly protrudes in the direction opposite to the light source 10. Thus, light having passed through the lens part 21 may focus on a particular point. In addition, in the variable-focus lens 20, when the connection part 22 is moved by an operation of the driver 30, the lens part 21 is deformed by the operation of the connection part 22. Thus, a position on which light focuses is adjusted. In other words, as illustrated in FIG. 2, when a right connection part 22 is moved to the left by an operation of the driver 30 and thus the shape of the lens part 21 is deformed, a position to which light exiting through the lens part 21 is emitted is adjusted.

The lens part 21 is formed in one example to convexly protrude and thus light focuses on a particular point. Further, when the shape of the lens part 21 is deformed by the driver 30, the focusing position of light is changed. Thus, light emitted from the light source 10 can be adjusted to be emitted to various positions.

In another embodiment, as illustrated in FIG. 3, the lens part 21 is formed in a zigzag type or to be bent and thus may be unfolded or folded by an operation of the driver 30. In other words, as illustrated in FIG. 3, when the lens part 21 is folded by an operation of the driver 30 and is thus formed in a zigzag type or to be bent, light passing through the lens part 21 is diffused. Further, as illustrated in FIG. 4, when the lens part 21 is unfolded by an operation of the driver 30, light passing through the lens part 21 is focused.

The lens part 21 is formed in one example in a zigzag configuration or to be bent, and thus light is diffused or focused. Therefore, light emitted from the light source 10 can be adjusted to be emitted to various positions.

As illustrated in FIG. 5, one portion of the edge of the variable-focus lens 20 may be fixed through a fixing part 40. The driver 30 may be connected to the side of the variable-focus lens 20 opposite to the fixing part 40.

Thus, the fixing part 40 is installed at one side of the variable-focus lens 20 and the driver 30 is connected to the other side of the variable-focus lens 20, whereby even one driver 30 may deform the variable-focus lens 20. In other words, when the driver 30 pushes or pulls the variable-focus lens 20 in order to deform the variable-focus lens 20, the fixing part 40 is connected to a side of variable-focus lens 20 opposite to the driver 30 to fix the position of the variable-focus lens 20. Thus, the variable-focus lens 20 may be smoothly deformed through one driver 30. Therefore, the variable-focus lens 20 may be deformed by one driver 30. Thus, a position and a type of light emitted from one light source 10 may be changed depending on the type of deformation of the variable-focus lens 20. In addition, one light source 10 and one driver 30 are used to change a position and a type of light that is emitted. Thus, manufacturing costs are reduced.

Multiple drivers 30 may be disposed (e.g., included or deployed) and the respective drivers 30 may be disposed to be symmetric to each other with reference to the center of the variable-focus lens 20.

The multiple drivers 30 are connected to the variable-focus lens 20. Thus, the variable-focus lens 20 can be deformed into various shapes by an operation of each of the drivers 30. The multiple drivers 30 may be disposed to be symmetric to each other with reference to the center of the variable-focus lens 20. The shape of the variable-focus lens 20 may be precisely deformed by an operation of each of the drivers 30.

In one example, the driver 30 may include a one-side (e.g., a first side) driver 31 and another-side (e.g., a second side) driver 32. The one-side driver 31 and the other-side driver 32 may be disposed at both sides of the variable-focus lens 20, respectively, so as to be symmetric to each other.

The one-side driver 31 and the other-side driver 32 are connected to one side and the other side of the variable-focus lens 20 with reference to the center of the variable-focus lens 20. Thus, the variable-focus lens 20 may be deformed at the one side and the other side thereof by operations of the one-side driver 31 and the other-side driver 32.

Thus, the multiple drivers 30 precisely deform the shape of the variable-focus lens 20. Light passing through the variable-focus lens 20 is thereby allowed to be emitted to a position or location within the interior of the vehicle desired by a user.

A variable-focus lighting system according to the present disclosure is illustrated in FIG. 6. The system includes: a light source 10 installed in an interior space so as to emit light in the interior space; a first variable-focus lens 20A on which light from the light source 10 is incident and which is configured to be flexibly deformed; and a second variable-focus lens 20B on which light having passed through the first lens is incident and which is configured to be flexibly deformed. The variable-focus lighting system further includes a first driver 30A connected to the first variable-focus lens 20A so as to deform the first variable-focus lens 20A in the lateral direction of the indoor space when a command signal is input and a second driver 30B connected to the second variable-focus lens 20B so as to deform the second variable-focus lens 20B in the forward/backward direction of the indoor space when a command signal is input. The system also includes a controller 50 configured to transfer, based on input desired lighting, command signals to the first driver 30A and the second driver 30B to deform the first variable-focus lens 20A and the second variable-focus lens 20B so that a position and a type of light emitted satisfy the desired lighting.

Here, the light source 10 may be formed as an LED and may be installed on an interior roof.

The first variable-focus lens 20A and the second variable-focus lens 20B are sequentially arranged in a direction away from the light source 10. Light emitted from the light source 10 passes through the first variable-focus lens 20A and the second variable-focus lens 20B and is emitted to the interior space. The first variable-focus lens 20A and the second variable-focus lens 20B are formed of a silicone material such that each allows light to pass therethrough and can be flexibly deformed. Therefore, light is refracted according to the type of deformation of the first variable-focus lens 20A and the second variable-focus lens 20B. Thus, a position and a type of light that is emitted can be adjusted.

Particularly, the first variable-focus lens 20A is deformed in the lateral direction of the interior space by the first driver 30A connected thereto. Thus, a position and a type of light that is emitted are changed in the lateral direction (e.g., left or right). Further, the second variable-focus lens 20B is deformed in the forward or backward direction of the interior space by the second driver 30B connected thereto. Thus, a position and a type of light that is emitted are changed in the forward or backward direction.

Thus, light emitted from the light source 10 may be adjusted in a 360° direction from the initial position by the first variable-focus lens 20A and the second variable-focus lens 20B. As a result, the emitted light can be directed to virtually any desired position or location within the vehicle interior, as permitted among the available positions achievable by the variable-focus lens 20. Further, the type of lighting can be adjusted by changing the diffusion and/or focus characteristics of the emitted light through deformation of the variable-focus lens 20.

The first driver 30A and the second driver 30B are controlled by the controller 50. In other words, the controller 50 transfers command signals to the first driver 30A and the second driver 30B on the basis of desired lighting input by a user's manipulation of a switch or desired lighting based on information about the user's position sensed by an interior sensor. Thus, a position and a type of light that is emitted satisfy the desired lighting through the deformation of the first variable-focus lens 20A and the second variable-focus lens 20B.

When the present disclosure is described in detail, as illustrated in FIG. 7, the first driver 30A includes the first X-axis driver 30A-1 and a second X-axis driver 30A-2. The first X-axis driver 30A-1 and the second X-axis driver 30A-2 are disposed to be symmetric to each other leftward and rightward from the center of the first variable-focus lens 20A.

The first X-axis driver 30A-1 and the second X-axis driver 30A-2 are connected to the left and right sides of the first variable-focus lens 20A with reference to the center thereof. Thus, the shape of the first variable-focus lens 20A may be deformed in the leftward or rightward direction by operations of the first X-axis driver 30A-1 and/or the second X-axis driver 30A-2. Thus, the emission direction of light, emitted from the light source 10 and passing through the first variable-focus lens 20A, may be adjusted in the leftward/rightward direction.

Therefore, when the desired lighting is input in a position spaced leftward from the installation position of the light source 10, the controller 50 transfers a command signal to the second X-axis driver 30A-2 such that the first variable-focus lens 20A is deformed leftward. When the desired lighting is input in a position spaced rightward from the installation position of the light source 10, the controller 50 transfers a command signal to the first X-axis driver 30A-1 such that the first variable-focus lens 20A is deformed rightward. In other examples, both of the X-axis drivers 30A-1 and 30A-2 may be operated in order to achieve the desired leftward or rightward emission direction.

The controller 50 determines whether desired lighting is leftward or rightward from the installation position of the light source 10. The controller 50 transfers, based on the determination, command signals to the first X-axis driver 30A-1 and/or the second X-axis driver 30A-2, thereby deforming the first variable-focus lens 20A. In other words, the controller 50 controls the first X-axis driver 30A-1 and the second X-axis driver 30A-2 on the basis of the desired lighting. In one example, when a command signal is transferred to the first X-axis driver 30A-1, the first X-axis driver 30A-1 deforms the first variable-focus lens 20A rightward. Thus, the focus of light emitted from the light source 10 is adjusted rightward. In one example, when a command signal is transferred to the second X-axis driver 30A-2, the second X-axis driver 30A-2 deforms the first variable-focus lens 20A leftward. Thus, the focus of light emitted from the light source 10 is adjusted leftward.

When the desired lighting is input so as to be diffused in the leftward or rightward direction from the installation position of the light source 10, the controller 50 transfers command signals to the first X-axis driver 30A-1 and the second X-axis driver 30A-2 such that the first variable-focus lens 20A is deformed into the initial shape or deformed to be unfolded in the leftward or rightward direction.

In this way, the controller 50 determines whether the desired lighting is diffused in the leftward or rightward direction from the installation position of the light source 10. The controller 50 controls the first X-axis driver 30A-1 and the second X-axis driver 30A-2 on the basis of the determination.

In other words, the initial shape of the first variable-focus lens 20A may be formed such that incident light exits while being diffused and may be changed into a shape in which the first variable-focus lens 20A is contracted by operations of the first X-axis driver 30A-1 and the second X-axis driver 30A-2. Therefore, when the desired lighting is input so as to be diffused in the leftward or rightward direction from the installation position of the light source 10, the controller 50 controls the first X-axis driver 30A-1 and the second X-axis driver 30A-2 not to operate at an original position. Thus, the first variable-focus lens 20A maintains the initial shape, thereby causing light emitted from the light source 10 to be diffused.

Further, when the first variable-focus lens 20A is deformed to be unfolded, light is diffused. Thus, the controller 50 inputs command signals into the first X-axis driver 30A-1 and the second X-axis driver 30A-2 so that the first variable-focus lens 20A is unfolded in the leftward and/or rightward direction by operations of the first X-axis driver 30A-1 and the second X-axis driver 30A-2. Therefore, light having passed through the first variable-focus lens 20A satisfies the desired lighting while being diffused.

As described above, the controller 50 may adjust the emission of light to a position, which satisfies the desired lighting, through the shape deformation of the first variable-focus lens 20A according to the desired lighting based on the user's manipulation of a switch or the information about the user's position.

As illustrated in FIG. 8, the second driver 30B may include a first Y-axis driver 30B-1 and a second Y-axis driver 30B-2. The first Y-axis driver 30B-1 and the second Y-axis driver 30B-2 may be disposed to be symmetric to each other forward and backward from the center of the second variable-focus lens 20B.

The first Y-axis driver 30B-1 and the second Y-axis driver 30B-2 are connected to the front and rear sides of the second variable-focus lens 20B with reference to the center thereof. Thus, the shape of the second variable-focus lens 20B may be deformed in the forward/backward direction by operations of the first Y-axis driver 30B-1 and the second Y-axis driver 30B-2. Therefore, the emission direction of light, emitted from the light source 10 and passing through the second variable-focus lens 20B, may be adjusted in the forward or backward direction.

When desired lighting is input in a position spaced forward from the installation position of the light source 10, the controller 50 transfers a command signal to the second Y-axis driver 30B-2 such that the second variable-focus lens 20B is deformed forward. When desired lighting is input in a position spaced backward from the installation position of the light source 10, the controller 50 transfers a command signal to the first Y-axis driver 30B-1 such that the second variable-focus lens 20B is deformed backward. In other examples, both of the Y-axis drivers 30B-1 and 30B-2 may be operated in order to achieve the desired forward or rearward emission direction.

Thus, the controller 50 determines whether the desired lighting is forward or backward from the installation position of the light source 10, and transfers, based on the determination, command signals to the first Y-axis driver 30B-1 and/or the second Y-axis driver 30B-2 such that the second variable-focus lens 20B is deformed. In other words, the controller 50 controls, based on the desired lighting, the first Y-axis driver 30B-1 and the second Y-axis driver 30B-2. In one example, when a command signal is transferred to the first Y-axis driver 30B-1, the first Y-axis driver 30B-1 deforms the second variable-focus lens 20B backward. Thus, the focus of light emitted from the light source 10 is adjusted backward. In one example, when a command signal is transferred to the second Y-axis driver 30B-2, the second Y-axis driver 30B-2 deforms the second variable-focus lens 20B forward. Thus, the focus of light emitted from the light source 10 is adjusted forward.

When the desired lighting is input to be diffused in the forward or backward direction from the installation position of the light source 10, the controller 50 transfers command signals the first Y-axis driver 30B-1 and the second Y-axis driver 30B-2 such that the second variable-focus lens 20B is deformed into the initial shape or deformed to be unfolded in the forward and/or backward direction.

Thus, the controller 50 determines whether the desired lighting is diffused in the forward/backward direction from the installation position of the light source 10, and controls, based on the determination, the first Y-axis driver 30B-1 and the second Y-axis driver 30B-2.

In other words, the initial shape of the second variable-focus lens 20B may be formed such that light exits while being diffused when the light is incident and may be deformed into a shape in which the second variable-focus lens 20B is contracted by operations of the first Y-axis driver 30B-1 and the second Y-axis driver 30B-2. Therefore, when the desired lighting is input to be diffused in the forward or backward direction from the installation position of the light source 10, the controller 50 controls the first Y-axis driver 30B-1 and the second Y-axis driver 30B-2 not to operate at the original position. Therefore, the second variable-focus lens 20B maintains the initial shape, thereby causing light emitted from the light source 10 to be diffused in the forward or backward direction.

Further, when the second variable-focus lens 20B is deformed to be unfolded, light is diffused. Thus, the controller 50 inputs command signals into the first Y-axis driver 30B-1 and the second Y-axis driver 30B-2 so that the second variable-focus lens 20B is unfolded in the leftward and/or rightward direction by operations of the first Y-axis driver 30B-1 and the second Y-axis driver 30B-2. Therefore, light having passed through the second variable-focus lens 20B may satisfy the desired lighting while being diffused.

As described above, the controller 50 may adjust the emission of light to a position, which satisfies the desired lighting, through the shape deformation of the second variable-focus lens 20B according to the desired lighting based on the user's manipulation of a switch or information about the user's position.

The controller 50 performs control such that the brightness of the light source 10 decreases when the input desired lighting is focused on a particular position and such that the brightness of the light source 10 increases when the input desired lighting is diffused.

In other words, light emitted from the light source 10 is focused or diffused depending on the shape of the variable-focus lens 20. When light is focused, the brightness of the light relatively increases, and when light is diffused, the brightness of the light relatively decreases.

Therefore, when light is focused through the variable-focus lens 20 by controlling the driver 30, the controller 50 controls the light source 10 to reduce the brightness of light. When light is diffused, the controller 50 controls the light source 10 to increase the brightness of light, whereby differences in light emission due to focusing or diffusion of light are reduced.

Another embodiment of the present disclosure as described above is described below.

As illustrated in FIG. 9, in order to emit light from the installation position of the light source 10 toward the front left side of an interior space, the second X-axis driver 30A-2 operates in the first variable-focus lens 20A to deform the first variable-focus lens 20A leftward. The second Y-axis driver 30B-2 operates in the second variable-focus lens 20B to deform the second variable-focus lens 20B forward. Thus, a position to which light emitted from the light source 10 is emitted is adjusted leftward when the light passes through the first variable-focus lens 20A, and the position to which the light is emitted is adjusted forward when the light passes through the second variable-focus lens 20B. As a result, the light is emitted to the front left side of the interior space.

Further, as illustrated in FIG. 10, in order to diffuse light from the installation position of the light source 10 toward the rear side of an indoor space, the first X-axis driver 30A-1 and the second X-axis driver 30A-2 return to the original positions in the first variable-focus lens 20A to unfold the first variable-focus lens 20A in the leftward and/or rightward direction. The first Y-axis driver 30B-1 operates in the second variable-focus lens 20B to deform the second variable-focus lens 20B backward. Thus, light emitted from the light source 10 is diffused when passing through the first variable-focus lens 20A and a position to which the light is emitted is adjusted backward when the light passes through the second variable-focus lens 20B. Therefore, as a result, the light is emitted to be diffused to the rear side of the interior space.

The variable-focus lighting device and the variable-focus lighting system, which are formed to have the above-described structures, adjust a position to which light is emitted among various positions in an interior space by using one light source 10. Therefore, the installation space on an interior roof is reduced and manufacturing costs are reduced.

The present disclosure has been illustrated and described in relation to specific embodiments. However, it should be apparent to those of ordinary skill in the art that the present disclosure can be variously modified and changed without departing from the technical sprit of the present disclosure provided in the following claims.

What is claimed is:

1. A variable-focus lighting device, the lighting device comprising:
   a light source configured to emit light;
   a variable-focus lens on which light from the light source is incident and which is configured to have a deformable shape such that a position and a type of light that is emitted are changed depending on a type of deformation; and
   a driver to which the variable-focus lens is connected, and which is configured to deform the variable-focus lens such that the position and the type of light that is emitted satisfy a command signal when the command signal is input
   wherein the variable-focus lens includes
      a lens part on which light from the light source is incident and which is configured to cause the incident light to exit with a focus, and
      a connection part extending from an edge of the lens part, connected to the driver, and configured to be moved by an operation of the driver to deform the lens part.

2. The lighting device of claim 1, wherein the lens part is formed to convexly protrude in a direction opposite to the light source and is configured to have a focus, which varies according to deformation of a shape of the lens part by movement of the connection part.

3. The lighting device of claim 1, wherein the lens part is formed in a zigzag configuration or to be bent, so as to be unfolded or folded by an operation of the driver.

4. The lighting device of claim 1, wherein one portion of an edge of the variable-focus lens is fixed through a fixing part, and wherein the driver is connected to a side of the variable-focus lens opposite to the fixing part.

5. The lighting device of claim 1, wherein the driver includes multiple drivers and the respective multiple drivers are disposed to be symmetric to each other with reference to a center of the variable-focus lens.

6. The lighting device of claim 5, wherein the multiple drivers comprise a one-side driver and another-side driver, and wherein the one-side driver and the other-side driver are disposed to be symmetric to each other at both sides of the variable-focus lens.

7. A variable-focus lighting system comprising:
   a light source installed in an interior space so as to emit light in the interior space;
   a first variable-focus lens on which light from the light source is incident and which is configured to be flexibly deformed;
   a second variable-focus lens on which light having passed through the first lens is incident and which is configured to be flexibly deformed;
   a first driver connected to the first variable-focus lens so as to deform the first variable-focus lens in a lateral direction of the interior space when a command signal is input;
   a second driver connected to the second variable-focus lens so as to deform the second variable-focus lens in the forward/backward direction of the interior space when a command signal is input; and
   a controller configured to transfer, based on input desired lighting, command signals to the first driver and the second driver to deform the first variable-focus lens and the second variable-focus lens so that a position and a type of light that is emitted satisfy the desired lighting.

8. The lighting system of claim 7, wherein the first driver comprises a first X-axis driver and a second X-axis driver, and wherein the first X-axis driver and the second X-axis driver are disposed to be symmetric to each other leftward and rightward from a center of the first variable-focus lens.

9. The lighting system of claim 8, wherein the controller is configured to:
   when the desired lighting is input in a position spaced leftward from an installation position of the light source, transfer a command signal to the second X-axis driver such that the first variable-focus lens is deformed leftward; and
   when the desired lighting is input in a position spaced rightward from the installation position of the light source, transfer a command signal to the first X-axis driver such that the first variable-focus lens is deformed rightward.

10. The lighting system of claim 8, wherein the controller is configured to, when the desired lighting is input so as to be diffused in a leftward or rightward direction from the installation position of the light source, transfer command signals to the first X-axis driver and the second X-axis driver such that the first variable-focus lens is deformed into an initial shape or deformed to be unfolded in the leftward or rightward direction.

11. The lighting system of claim 7, wherein the second driver comprises a first Y-axis driver and a second Y-axis driver, and wherein the first Y-axis driver and the second Y-axis driver are disposed to be symmetric to each other forward and backward from a center of the second variable-focus lens.

12. The lighting system of claim 11, wherein the controller is configured to:
   when the desired lighting is input in a position spaced forward from the installation position of the light source, transfer a command signal to the second Y-axis driver such that the second variable-focus lens is deformed forward; and
   when the desired lighting is input in a position spaced backward from the installation position of the light source, transfer a command signal to the first Y-axis driver such that the second variable-focus lens is deformed backward.

13. The lighting system of claim 11, wherein the controller is configured to, when the desired lighting is input to be diffused in the forward or backward direction from the installation position of the light source, transfer command signals to the first Y-axis driver and the second Y-axis driver such that the second variable-focus lens is deformed into the initial shape or deformed to be unfolded in the forward or backward direction.

14. The lighting system of claim 7, wherein the controller is configured to perform control such that brightness of the light source varies when the input desired lighting is focused on a particular position or is diffused.

* * * * *